US010392906B2

(12) United States Patent
Abrand et al.

(10) Patent No.: US 10,392,906 B2
(45) Date of Patent: Aug. 27, 2019

(54) METHOD OF MAKING SAFE AN UNDERSEA BOTTOM-TO-SURFACE PRODUCTION PIPE WHEN RESTARTING PRODUCTION

(71) Applicant: SAIPEM S.A., Montigny le Bretonneux (FR)

(72) Inventors: Stéphanie Abrand, Villiers Saint Frederic (FR); Stéphane Anres, Saint Cyr l'Ecole (FR); Lionel Macauley, Paris (FR)

(73) Assignee: Saipem S.A., Montigny le Bretonneux (FR)

(*) Notice: Subject to any disclaimer, the term of this patent is extended or adjusted under 35 U.S.C. 154(b) by 0 days.

(21) Appl. No.: 15/956,565

(22) Filed: Apr. 18, 2018

(65) Prior Publication Data
US 2018/0298733 A1  Oct. 18, 2018

(30) Foreign Application Priority Data
Apr. 18, 2017  (FR) ...................................... 17 53326

(51) Int. Cl.
*E21B 43/01* (2006.01)
*E21B 43/38* (2006.01)
*F17D 1/16* (2006.01)
*E21B 43/013* (2006.01)
*E21B 41/00* (2006.01)
(Continued)

(52) U.S. Cl.
CPC ...... *E21B 43/0107* (2013.01); *E21B 41/0007* (2013.01); *E21B 43/01* (2013.01); *E21B 43/013* (2013.01); *E21B 43/38* (2013.01); *F17D 1/16* (2013.01); *F16L 55/46* (2013.01); *F17C 11/007* (2013.01)

(58) Field of Classification Search
CPC .... E21B 43/01; E21B 41/0007; E21B 43/013; E21B 43/0107; E21B 43/38; F16L 55/46; F17C 11/007; F17D 1/16
See application file for complete search history.

(56) References Cited

U.S. PATENT DOCUMENTS

2002/0044838 A1  4/2002 Amin et al.
2008/0093081 A1  4/2008 Stoisits et al.
(Continued)

FOREIGN PATENT DOCUMENTS

WO  WO 2009/042307  4/2009

*Primary Examiner* — Carib A Oquendo
(74) *Attorney, Agent, or Firm* — Cozen O'Connor

(57) ABSTRACT

Method of stopping and restarting production in an undersea bottom-to-surface connection production pipe having a first pipe portion on the sea bottom from a well head to the bottom end of a second pipe portion extending to a ship or floating. When production is stopped, at least the first pipe portion is filled with a depressurized production fluid. Thereafter the following steps are performed: e1) forming a gel from two reagents in a first gel-forming chamber on the sea bottom; e2) sending a quantity of separator gel into the first pipe portion that pushes the cold fluid contained in the first pipe portion to the second pipe portion, prior to closing the first chamber; and then; e3) starting production, the gel forming physical separation and thermal and chemical isolation between firstly the production fluid and secondly a production fluid within the first production pipe portion.

30 Claims, 7 Drawing Sheets

(51) Int. Cl.
 *F17C 11/00* (2006.01)
 *F16L 55/46* (2006.01)

(56) References Cited

U.S. PATENT DOCUMENTS

| | | | |
|---|---|---|---|
| 2008/0135258 A1* | 6/2008 | Daniel | B63B 21/508 |
| | | | 166/363 |
| 2009/0321082 A1* | 12/2009 | Kinnari | E21B 37/06 |
| | | | 166/371 |
| 2010/0252260 A1* | 10/2010 | Fowler | F17D 1/17 |
| | | | 166/275 |
| 2017/0336010 A1* | 11/2017 | Settouti | E21B 36/00 |

* cited by examiner

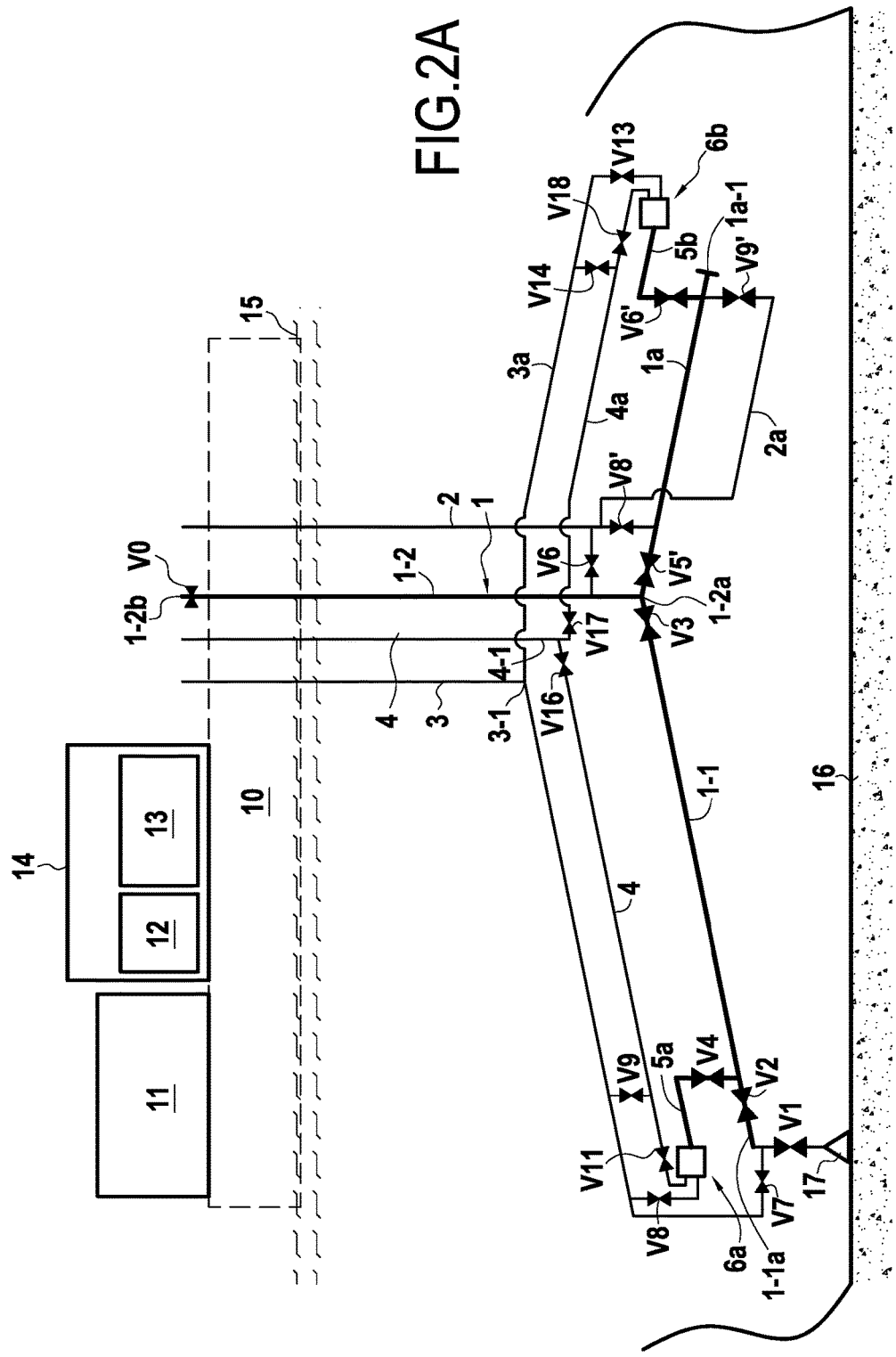

METHOD OF MAKING SAFE AN UNDERSEA BOTTOM-TO-SURFACE PRODUCTION PIPE WHEN RESTARTING PRODUCTION

BACKGROUND OF THE INVENTION

1. Field of the Invention

The present invention relates to the general field of fluid transport pipes for transferring hydrocarbons, in particular crude oil containing a majority oil phase of hydrocarbons, together with water and gas, coming from undersea production wells and referred to below as "production fluid".

2. Description of the Related Art

The invention relates more precisely to a method of managing the stopping and restarting of production via an undersea bottom-to-surface connection pipe connecting the bottom of the sea to supports floating on the surface.

The invention applies more particularly to developing oil fields in deep sea water, i.e. oil installations installed in the open sea where surface equipment is generally situated on floating structures, while the well heads are at the bottom of the sea. The pipes concerned by the present invention comprise more particularly "risers", i.e. pipes providing a bottom-to-surface connection and rising to the surface, and also pipes resting on the sea bottom and connecting well heads to said risers.

The main application of the invention relates pipe that are immersed, undersea or underwater, and more particularly at great depths, greater than 300 meters (m) and conveying hot petroleum products for which excessive cooling would be problematic in the event of production being stopped. At present, deep sea developments are taking place in depths of water that are as much as 1500 m. Future developments are envisaged in depths of water of up to 3000 m to 4000 m and even more.

The person skilled in the art knows that dehydrated gas can be injected into the bottom of a riser column at great depth to provide "gas lift" that is used to reduce the pressure due to the hydrostatic column, and thereby improve the productivity of production wells.

In that type of application, numerous problems arise, particularly in the event of production being stopped, whenever the temperature of the petroleum products decreases by a large value that is significant compared with the production temperature, which is often higher than 60° C. to 80° C., while the temperature of the surrounding water, particularly at great depth, can be well below 10° C., and may be 4° C. If petroleum products cool below 30° C. to 60° C., for example, from an initial temperature of 70° C. to 80° C., the following are generally observed:

a great increase in viscosity, which thus decreases the flow rate of the pipe;

precipitation of dissolved paraffin, which increases the viscosity of the product and, on becoming deposited, can reduce the usable inside diameter of the pipe;

flocculation of asphaltenes, giving rise to the same problems; and the sudden, compact, and massive formation of gas hydrates that precipitate at high pressure and low temperature, thereby suddenly obstructing the pipe by forming plugs.

Paraffins and asphaltenes remain attached to the wall and then require the inside of the pipe to be cleaned by scraping; in contrast, hydrates are even more difficult, and sometimes even impossible to resorb.

Furthermore, in riser columns, gas mixed with crude oil and water tends to expand as it rises since hydrostatic pressure becomes less. Since this expansion is practically adiabatic, heat is taken from the multiphase fluid itself, thereby significantly reducing its internal temperature, which can go down to a temperature in the range 8° C. to 15° C. over a height difference of 1500 m, which can lead to hydrate plugs being formed.

Thermally insulating and heating such pipes can slow down the cooling of the petroleum effluents conveyed, not only under steady production conditions for which the temperature is for example at least 40° C. on reaching the surface, starting from a production temperature on entry into the pipe lying in the range 70° C. to 80° C., but also in the event of production being reduced or even stopped, so as to avoid the temperature of the effluents dropping below 30° C., for example, in order to limit the above-mentioned problems, or at least in order to ensure that they are reversible.

It is known to heat double-walled pipes over their entire length using a plurality of electric cables that are wound around the outer surface of the inner wall of the pipes in order to perform Joule effect heating. That heating solution, known as "heat tracing", serves to keep the hydrocarbon fluid transported in undersea pipes at a temperature higher than a critical temperature over their entire path from the production well to the installation on the surface, thus avoiding the formation of hydrate crystals or of other solid deposits that would lead to the creation of plugs capable of blocking the undersea pipe. In particular, such heat tracing serves to keep the temperature of the production fluid above the critical threshold during stages of stopping, thus enabling preservation to be almost immediate after it has been activated. This method is shown in FIG. 1.

In the event of a stop for several days or several weeks, the conditions of high pressure and dropping temperature at the time of stopping leads to a risk of causing a hydrate plug to be formed. That is why the standard preservation method is to begin by depressurizing the pipe. Since that measure is not sufficient for preserving the pipe at great depth, once the well head valve has been closed upstream from the pipe and the pipe has been depressurized by opening the valve at the top of the riser on the surface, a looped flow is initiated of an inert substitution product, e.g. diesel or dead crude oil (i.e. crude oil that has been degassed). The term "inert" is used herein to mean that the fluid does not react to form hydrate crystals.

That "conventional" or "hybrid" loop method is shown in FIG. 1. The method serves to allow the pipe to go down to a temperature of 4° C. without forming hydrate plugs. Thereafter, on restarting, the same diesel is generally used for reheating the pipe by causing it to flow around a loop from the floating support where it is heated by being passed through boilers or heat exchangers, with the heat being recovered from gas turbines. It is only after this stage of heating with a flow of hot diesel that it is possible to reopen the well head valves and restart production.

Specifically, if production is started prematurely before sufficient prior heating of the line, then as the crude oil advances towards the floating production storage and offloading (FPSO) unit, and after travelling a few kilometers, or even only a few hundred meters, the oil, even though it leaves the well at high temperature, e.g. 75° C., suffers a drop in temperature to the critical value at which the unwanted phenomena of forming hydrate plugs or paraffin plugs can occur, which would result in blocking the stream of crude oil.

US 2002/044838, US 2008/093081, and WO 2009/042307 describe a method in which, after the pipe has been depressurized following a stop in production, the fluid it contains is replaced by an inert replacement fluid. In order to replace the production fluid present in the pipe at the time of stoppage, a mechanical scraper is used that was previously stored close to the inlet of the pipe, together with a substance that inhibits plug formation referred to as a hydrate formation inhibitor, or that cannot form hydrates, and also referred to below as a hydrate formation inhibitor, such as methanol, glycol, or mono ethylene glycol (MEG), and a driver fluid is injected into the pipe upstream therefrom on the sea bottom, so as to drive and move forwards the inhibitor and the mechanical scraper by pushing them along the pipe towards the surface. The driver fluid is diesel or dead crude oil combined with a hydrate inhibitor and acts as the replacement fluid in the pipe. The water injection line enables the scraper to be replaced on the storage site in order to provide subsequent preservation. Since the replacement fluid does not contain gas or water, and/or contains a hydrate formation inhibitor, there is no risk of hydrates forming on restarting.

The drawback of the method described in WO 2009/042307, as in so-called "loop" methods, is that they require a large quantity of replacement fluid in order both to fill the entire pipe and also to send a mechanical scraper down from the surface.

Unfortunately, with an undersea production pipe of great length (several kilometers), and with a portion of pipe resting on the sea bottom extending from the well head at the sea bottom to the bottom end of a pipe in the form of a rising column or "riser", the method can become onerous and lengthy to perform.

Furthermore, using a mechanical scraper during the preservation stage runs an operational risk of the scraper becoming blocked, which might lead to conditions appropriate for forming a hydrate plug under certain circumstances.

SUMMARY OF THE INVENTION

A main object of the present invention is thus to provide an improved method for facilitating the restarting of production in an undersea bottom-to-surface connection pipe after a prolonged stop of production, and in particular to avoid hydrates forming when restarting production.

In accordance with the invention, this object is achieved by providing a method of stopping and restarting production in an undersea bottom-to-surface connection production pipe comprising a first pipe portion resting on the sea bottom from a well head to the bottom end of a second pipe portion going up to a ship or floating support on the surface, in which method, when production is stopped, at least said first pipe portion is filled with a depressurized production fluid, the method being characterized in that the following restarting steps are performed:

e1) forming a gel from two reagents in a first gel-forming chamber on the sea bottom, said first chamber communicating with the end of the first pipe portion that is closest to the well head, said first chamber preferably being formed by a pipe segment in situ on the sea bottom, having its end leading to the proximity of the end of the first pipe portion resting on the sea bottom that is closest to the well head; and e2) sending a quantity of said gel into the first pipe portion from said first chamber forming a separator gel segment that pushes the cold fluid contained in the first pipe portion to the second pipe portion, prior to closing said first chamber; and then e3) starting production by sending said production fluid from the production fluid well into the first pipe portion behind said separator gel segment, said production fluid pushing said gel segment into said bottom-to-surface connection pipe towards its top, said gel forming a physical separation and thermal isolation between firstly the production fluid behind said gel segment within the first pipe portion and secondly a fluid that has been at least partially degassed ahead of said gel segment within said first production pipe portion.

The invention thus essentially proposes using a gel that physically and thermally isolates the old fluid, which is cold and depressurized, relative to the new production fluid, which is hot.

It can be understood that said gel is sufficiently viscous and is provided in sufficient quantity to form a physical separation that prevents any contact or mixing between the fluids situated at opposite ends of the gel in said first production pipe portion, i.e. a hot production fluid coming from the well head and a cold fluid, which may be a preferably degassed cold production fluid, that was initially contained in the pipe after stopping production. This separation constitutes thermal and physical isolation preventing mixing of the two fluids at opposite ends of the gel, and thus preventing hydrates forming within the first pipe portion.

This type of gel is known to the person skilled in the art in particular under the term "gel pig", and it is suitable for being formed at the surface on board the ship or floating support and subsequently being sent from the surface in a pipe to the sea bottom during activities of preconditioning the pipe when it is initially put into service. Nevertheless, the two reagents are mixed in those known applications either on injection from a support boat or else prior to installing the system, e.g. using a flowline end termination (FLET). No known application exists in which the reagents are injected from an FPSO unit or ship on the surface at the undersea production site in order to create the gel pig in situ. Nor does there exist any application in which the gel pig is used systematically for starting production other than for the initial start of production after installing the line.

In the present invention, the gel is made available much more easily and more quickly for sending into the first pipe portion when restarting production. The gel then performs a function that is novel in that it serves to separate two production fluids, one of which has been degassed and the other one of which has been newly produced and contains gas, thereby enabling the undersea field to be restarted.

When the degassed production liquid that is cold in the first pipe portion is in a condition where hydrate might be formed (zones Z1 or Z2 as described below) at the pressure that results from the liquid column in the second pipe portion, all of the liquid contained in said second pipe portion is preferably emptied out prior to restarting production in step e3), and prior to putting the first production pipe portion into communication with said second production pipe portion.

More preferably, in step e3), rising of the production fluid in said second production pipe portion is facilitated by sending gas from the ship or floating support on the surface via a first auxiliary pipe for transporting gas that extends from the surface to the bottom end of the second production pipe portion, to which it is connected.

The emptying of said second pipe portion prior to restarting production in step e3), and prior to putting the first production pipe portion filled with production fluid into communication with said second production pipe portion serves to avoid the pressure of the fluid inside the first pipe portion resting on the sea bottom rising suddenly in said first pipe portion when the first pipe portion is put into communication with the second production pipe portion by opening a first valve V3, which could give rise to hydrates forming in said first pipe portion. Said first pipe portion is thus maintained at a pressure that does not allow hydrates to form at the temperature of the sea bottom, i.e. about 4° C.

More particularly, in step e1), the following steps are performed:

e1-1) sending, preferably from the ship or floating support on the surface, a first liquid reagent compound into a second auxiliary pipe extending to a first static mixer situated on the sea bottom and leading into said first chamber; and e1-2) in parallel with e1-1), sending, preferably from the ship or floating support on the surface, a second liquid reagent compound in a third auxiliary pipe extending to said first static mixer situated on the sea bottom and leading into said first chamber; and e1-3) mixing the two reagents within said static mixer and allowing the separator gel to form by reaction between the mixture of two reagents within said first chamber.

Alternatively, in steps e1-1) and e1-2), said first and second reagent compounds may be stored in tanks at the bottom of the sea and may thus be transferred from said sea bottom tank to said first static mixer.

Still more particularly, after step e1), the reagents contained in said second and third auxiliary pipes are replaced by an inert replacement fluid, preferably methanol. This serves to avoid said reagents stagnating in said pipes and potentially degrading, leading subsequently to the formation of a gel that is not suitable for performing the above-mentioned separation and driving functions.

More particularly, the reagents contained in said second and third auxiliary pipes are replaced by an inert replacement fluid, preferably methanol, by sending said replacement fluid from the ship or floating support on the surface into said second auxiliary pipe and by discharging the content of said second auxiliary pipe to the third auxiliary pipe and then to the top of the third auxiliary pipe at the ship or floating support, said second and third auxiliary pipes being made suitable for communicating with each other, preferably immediately ahead of said first mixer. This can occur if said second and third auxiliary pipes are made suitable for communicating with each other immediately in front of said first mixer via an open communication valve V9, respective valves V8 and V11 for isolating the second and third auxiliary pipes from the first mixer being closed. Alternatively, it is possible to replace the reagents as far as the mixer by a flow of the same inert replacement fluid, preferably methanol, by closing or by keeping closed the communication valve V9 between the second and third auxiliary pipes, a communication valve V4 between the first chamber and the distal end of the second production pipe portion being closed, and the valves (respectively V8 and V9) for isolating the second and third auxiliary pipes from the first mixer being open.

More particularly, in step e2), an inert replacement fluid such as methanol is sent from the ship or floating support on the surface in a said second or third auxiliary pipe, thereby pushing said separator gel from said first chamber towards said first production pipe portion.

More particularly, in known manner in step e3), a hydrate formation inhibitor, preferably methanol, is sent from the ship or floating support on the surface in a said second or third auxiliary pipe to the end of the first production pipe portion that is in the proximity of the well head, in the production fluid that is sent in the first pipe portion.

In another aspect of the invention, after stopping production, first depressurization of the entire bottom-to-top connection production undersea pipe is performed allowing a portion only of the gas contained in the production fluid contained in said production pipe to be discharged on the surface via its top end, the method being characterized in that the following subsequent steps are then performed:

a) isolating said first production pipe portion from said second pipe portion, and leaving the production fluid in said first production pipe portion, but not in said second pipe portion, which is emptied; and b) additionally depressurizing the first production pipe portion filled with production fluid by reducing the pressure in said first pipe portion and by discharging more completely the gas contained in the production fluid that it contains.

This additional degassing of the production fluid contained in the first pipe portion serves to further reduce the pressure of the first pipe portion to a level that is substantially identical to the pressure at the surface, thereby further reducing any risk of hydrates forming in said first pipe portion resting on the sea bottom without needing to replace the fluid therein. Otherwise, the pressure in the first pipe portion and at the well head would be associated with the hydrostatic column of said second pipe portion, and depressurizing would not make it possible to reduce the risk of hydrates forming under certain circumstances.

More particularly, in order to stop production and perform the first depressurization of the entire pipe, at least one valve V2 at the end of the first pipe portion resting on the sea bottom that is closest to the well head is closed and a valve V0 at the top of the second pipe portion at the surface is opened.

More particularly, the additional depressurization of the first production pipe portion is performed by:

isolating the first pipe portion from the second pipe portion by closing a first valve V3 at the connection between the end of the first pipe portion and the bottom end of the second pipe portion, said first valve V3 as closed in this way preventing fluid flow communication between said first pipe portion and said second pipe portion; and opening a second valve V5 or V5' situated in the proximity of said first valve V3, said second valve leading directly to an auxiliary pipe for allowing gas to rise up to the ship or floating support on the surface either directly or via a buffer tank, and preferably via a buffer pipe as described below.

In a first implementation, the following steps are performed:

a1) in step a), after isolating said second pipe portion from said first pipe portion, replacing the production fluid within said second pipe portion by injecting an inert replacement fluid into a second auxiliary pipe extending from a first tank on the ship or floating support on the surface to the bottom end of the second pipe portion isolated from the first pipe portion, preferably an inert fluid also including or constituting a hydrate formation inhibitor; and b1) in step b), performing additional depressurization of the first production pipe portion isolated from said second pipe portion and filled with production fluid, by reducing the pressure in said first pipe portion and more completely discharging the gas contained in the production fluid it contains, to an auxiliary gas discharge pipe extending from the end of said first production pipe portion closest to the bottom end of said second production pipe portion to the ship or floating support on the surface.

Still more particularly, in step a1), the production fluid within said second pipe portion is replaced by injecting an inert replacement fluid, preferably an inert fluid also including or constituting a hydrate formation inhibitor, from a first tank on the ship or floating support on the surface into a first auxiliary gas riser pipe or a second auxiliary pipe extending to the bottom end of the second pipe portion that is previously isolated from the first pipe portion after depressurizing said first pipe portion, said inert fluid thus replacing and pushing the production fluid back towards the ship or floating support.

More particularly, before the steps of restarting production in step e3), before putting the first pipe portion resting on the sea bottom into communication with the second pipe portion rising to the surface and sending the production fluid from the well head, said second pipe portion is emptied by injecting inert gas into the second pipe portion from the top of the second pipe portion and discharging the inert replacement fluid from the second pipe portion to the surface via a first auxiliary gas riser pipe that extends up to the surface from the bottom end of said second pipe portion to which it is connected. This operation is necessary when the degassed and cold production in the first pipe portion is in a condition for hydrates to form at the pressure that results from the liquid column in the second pipe portion. Otherwise, i.e. if the degassed production at the sea bottom temperature is not in a condition to form hydrates even at the pressure that results from putting the first and second pipe portions into communication without emptying the second pipe portion, then there is no need to empty the second pipe portion of its replacement fluid.

It is then necessary to depressurize the gas that has been used for purging said second pipe portion and said first auxiliary pipe before it is possible to open said first valve V3 providing separation between said first and second production pipe portions, and send therein the production fluid coming from the well head.

This makes it possible to avoid a sudden rise in the pressure of the fluid inside the first pipe portion resting on the sea bottom, which could cause hydrates to form in said second pipe portion on putting the first pipe portion into communication with the second production pipe portion, since said first pipe portion is thus maintained at a pressure that corresponds to atmospheric pressure at the surface.

In a second implementation, the following steps are performed:

a2) in step a), leaving the production fluid in said first production pipe portion, and emptying said second pipe portion isolated from said first pipe portion by transferring the production fluid within said second pipe portion into a buffer tank connected to the bottom end of said second pipe portion, said buffer tank preferably being a buffer pipe extending on the sea bottom from the bottom end of the said second pipe portion; and b2) in step b), performing additional depressurization of the first production pipe portion filled with production fluid by putting it into communication with said second pipe portion and by more completely discharging the gases contained in the production fluid of the first pipe portion towards said second production pipe portion that has previously been emptied of all liquid.

It can be understood that said buffer pipe forms a buffer tank in that it is connected to the bottom end of said second pipe portion beside its proximal end, while its distal end is closed.

More particularly, in step a2), in order to transfer the production fluid from said second pipe portion to a buffer tank formed by a buffer pipe extending on the sea bottom from the bottom end of said second pipe portion, the gas contained in the buffer pipe is simultaneously discharged via a first auxiliary gas riser pipe that is connected thereto via respective valves situated firstly at its proximal end and secondly at its distal end.

Preferably, in this implementation, before restarting production in steps e1) to e3), said buffer tank, preferably said buffer pipe, is emptied. This enables the buffer pipe to be available for emptying the second pipe portion therein next time production is stopped.

Still more particularly, in order to empty the buffer pipe, a separator gel is inserted at the distal end of the buffer pipe and is pushed by injecting gas so as to cause it to move together with the liquid content of the buffer pipe towards the bottom end of the second pipe portion, and then all along the second pipe portion in order to be evacuated at the top thereof. It can be understood that the separator gel forms a chemical scraper that is sufficiently solid and leaktight to be capable of being pushed by the gas and of separating it physically from the liquid content of said buffer pipe, thereby emptying it. Furthermore, the absence of separator gel between the gas and the production remaining in the buffer pipe would lead to ineffective emptying of the production liquid.

In another aspect of the invention, before emptying the buffer pipe by introducing a separator gel, the following steps are performed:

c) forming a gel from two reagents in a second separatorgel-forming chamber on the sea bottom, said second chamber communicating with the distal end of the buffer pipe, said second chamber preferably being formed by an in situ pipe segment on the sea bottom having its end leading to the proximity of the distal end of the buffer pipe resting on the sea bottom; and d) sending a quantity of said separator gel into the buffer pipe from said second chamber and forming a separator gel segment pushing the fluid contained in the buffer pipe to the top of said second production pipe portion, prior to closing said second chamber.

More particularly in step d), once the separator gel is in the buffer pipe, gas is injected from the ship or floating support on the surface via a first auxiliary pipe and a branch connection pipe leading to the distal end of the buffer pipe in order to push the separator gel and the production fluid downstream therefrom to the top of said second production pipe portion.

More particularly, in order to form the separator gel in step c), the following steps are performed:

c1 sending, preferably from the ship or floating support on the surface, a first reagent liquid compound in a said second auxiliary pipe and then a second branch connection pipe extending to a second static mixer situated at the sea bottom and leading to said second chamber; and c2) ending, preferably from the ship or floating support on the surface, a second reagent liquid compound in a third auxiliary pipe and then a third branch connection pipe extending to said second static mixer situated on the sea bottom and leading to said second chamber; and c3) mixing the two reagents within said second static mixer and allowing the separator gel to form by reaction between the mixture of two reagents within said second chamber.

Alternatively, in steps c1) and c2), said first and second reagent compounds may be stored in sea bottom tanks and may thus be transferred from said sea bottom tanks to said second static mixer.

More particularly, after step d), the reagents contained in said second and third auxiliary pipes and said second and third branch connection pipes are replaced by an inert replacement fluid, preferably methanol.

This makes it possible to avoid said reagents stagnating in said pipes, where they might potentially become degraded and lead to a gel being formed subsequently that is not suitable for performing the separation and driving functions specified herein.

Still more particularly, the reagents contained in said second and third auxiliary pipes and said second and third branch connection pipes are replaced by an inert replacement fluid, preferably methanol, by sending said replacement fluid from the ship or floating support on the surface into said second auxiliary pipe and discharging the content of said second auxiliary pipe to the third auxiliary pipe and then to the top of the third auxiliary pipe at the ship or floating support on the surface, said second and third auxiliary pipes being made suitable for communicating with each other, preferably immediately ahead of said second mixer.

This can be done by discharging said content from the third auxiliary pipe via an open valve V14 providing communication between said second and third auxiliary pipes immediately ahead of said second mixer, or on the contrary via said second mixer by closing or by keeping closed the valve V14 for providing communication between the second and third auxiliary pipes, a valve V6' for providing communication between the second chamber and the distal end of the buffer pipe then being closed, and valves V13 and V18 for providing isolation between the second and third auxiliary pipes and said second mixer being opened.

More particularly, in step d), before closing said second chamber, an inert fluid such as methanol is sent from the ship or floating support on the surface into a said second or third auxiliary pipe and said second or third branch connection pipes, thereby pushing said separator gel from said second chamber into said buffer pipe prior to pushing it to the top of said second production pipe portion by injecting gas into the end of the buffer pipe.

Still more particularly, in step d), or after step d), the gel and the liquid in said buffer pipe and then in the second production pipe portion is raised by sending inert gas from the ship or floating support on the surface into said first auxiliary pipe leading to the distal end of the buffer pipe.

The present invention also provides an installation for producing fluid such as crude oil and suitable for performing the method of the invention, the installation comprising at least:

a ship or floating support on the surface having at least two tanks, and preferably at least three tanks; and an undersea bottom-to-surface connection production pipe comprising a first pipe portion resting on the sea bottom from a well head to the bottom end of a second pipe portion rising to a ship or floating support on the surface; and a first auxiliary pipe for transporting gas extending at least from the ship or floating support on the surface to the bottom end of said second pipe portion; and a second auxiliary pipe extending at least from a first or second tank containing an inert replacement fluid or a first separator gel reagent on board the ship or floating support on the surface to a first static mixer, said second auxiliary pipe being suitable for transferring said inert replacement fluid or first separator gel reagent into said first mixer; and a third auxiliary pipe extending at least from a third tank containing a second separator gel reagent on board the ship or floating support on the surface to a first static mixer, said third auxiliary pipe being suitable for transferring said second separator gel reagent into said first mixer; and a first separatorgel-forming chamber, preferably formed by a pipe segment situated on the sea bottom at an end to which said first mixer leads, said first chamber leading at its other end to the proximity of the end of the first pipe portion resting on the sea bottom that is closest to the well head.

More particularly, the installation of the invention has a plurality of valves, comprising at least:

a valve suitable for isolating or putting into communication said first chamber and the end of said first production pipe portion that is closest to the well head; and respective valves suitable for isolating or putting into communication said second and third auxiliary pipes with said first mixer; and preferably a valve suitable for isolating or putting into communication said second and third auxiliary pipes immediately ahead of said first mixer.

More particularly, the installation has a plurality of valves comprising at least:

a valve suitable for isolating or putting into communication said first auxiliary pipe for transporting gas and the bottom end of said second production pipe portion; and a valve suitable for isolating or putting into communication said first production pipe portion and said second production pipe portion, end to end.

In a first embodiment, the installation of the invention has a valve suitable for isolating or putting into communication said second auxiliary pipe and the bottom end of said second pipe portion.

More particularly, the installation in this embodiment further has a valve suitable for isolating or putting into communication the proximal end of said first production pipe portion and the bottom end either of a fourth auxiliary pipe rising directly to the surface, or else a bottom portion of said first auxiliary pipe connected via an isolating or communicating valve to a top portion of said first auxiliary pipe, said first portion of said first auxiliary pipe being connected to a valve suitable for isolating or putting into communication said first auxiliary pipe and the bottom end of said second production pipe portion.

In a second embodiment, the installation further comprises a buffer tank connected to the bottom end of said second pipe portion, said buffer tank preferably being a buffer pipe extending on the sea bottom from the bottom end of said second pipe portion.

Still more particularly, in this second embodiment, the installation further comprises a second separatorgel-forming chamber, preferably formed by a segment of pipe situated on the sea bottom to one end of which a second static mixer leads, said second chamber leading at its other end to the proximity of the distal end of the buffer pipe resting on the sea bottom.

Still more particularly in this second embodiment, the installation further comprises:

a first branch connection pipe for transporting gas extending from said first auxiliary pipe to the distal end of the buffer pipe;

a second branch connection pipe extending from said second auxiliary pipe to a second static mixer situated on the sea bottom and leading to a second chamber; and a third branch connection pipe extending from a third auxiliary pipe to said second static mixer situated on the sea bottom and leading to said second chamber; and said second chamber leading to the distal end of the buffer pipe.

Still more particularly in this second embodiment, the installation has a plurality of valves comprising at least:

a valve suitable for isolating or putting into communication the proximal end of the buffer pipe and the bottom end of said production pipe portion; and a valve suitable for isolating or putting into communication the distal end of the buffer pipe and the distal end of said first branch connection pipe for transporting gas; and preferably, a valve suitable for isolating or putting into communication the distal end of said first auxiliary pipe for transporting gas or the proximal end of said first branch connection pipe for transporting gas with the proximal end of the buffer pipe.

Still more particularly in this second embodiment, the installation has a plurality of valves, comprising at least:

valves suitable for isolating or putting into communication said second and third branch connection pipes respectively with said second mixer; and preferably, a valve suitable for isolating or putting into communication said second and third branch connection pipes immediately ahead of said second mixer.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Other characteristics and advantages of the present invention appear from the following description made with reference to the accompanying drawings, which show embodiments having no limiting character.

In the figures:

FIGS. 2A and 2B are diagrammatic views of an installation for preserving a production pipe when stopping production and restarting production in a second implementation of the invention using Example 2.

DETAILED DESCRIPTION OF THE PRESENTLY PREFERRED EMBODIMENTS

In the present description, the term "valve" is used to designate a valve that is suitable for isolating two pipes from each other or for putting them into communication with each other.

Figure 1:
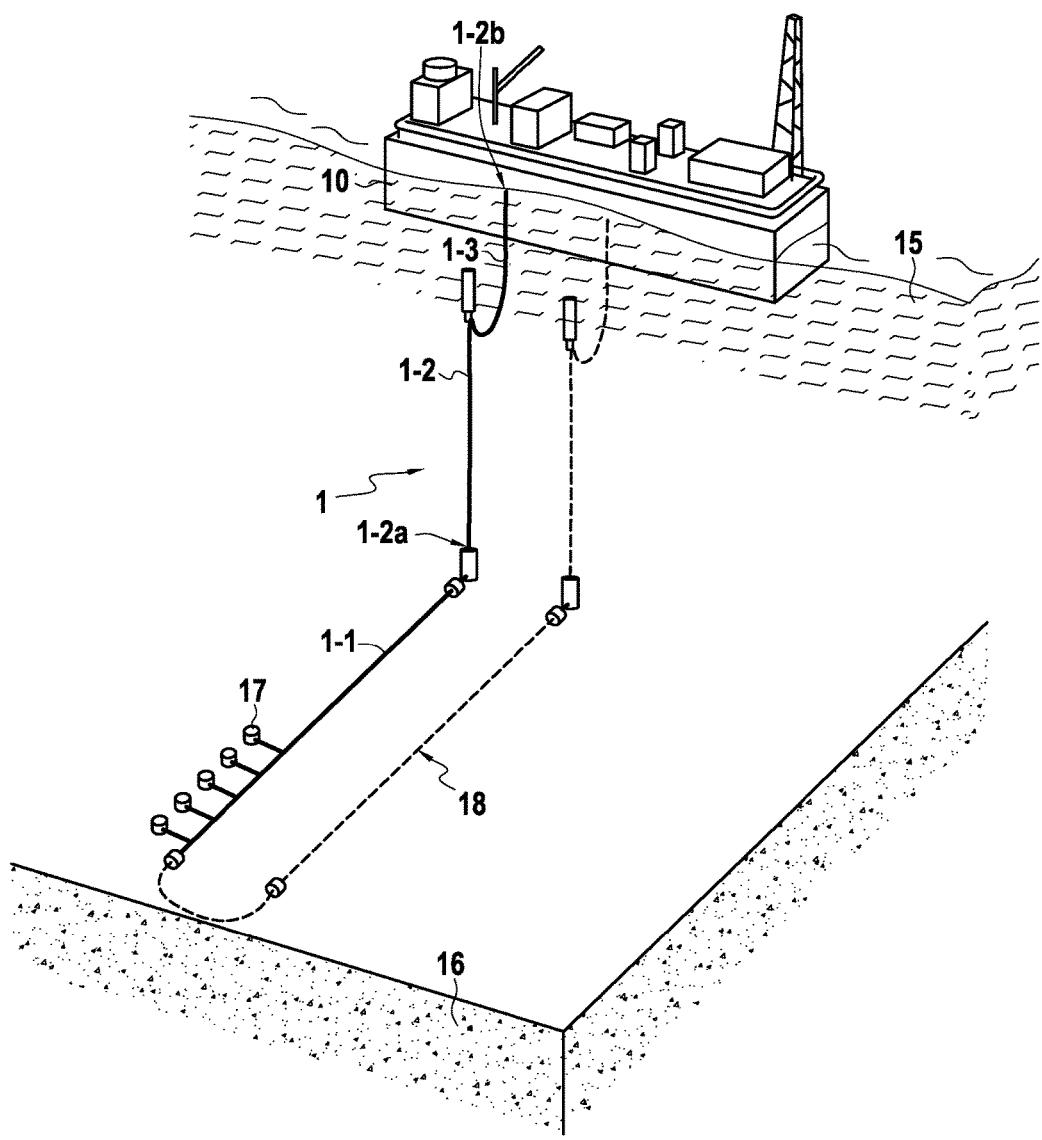
FIG. 1 is a diagrammatic view of an installation for preserving a production pipe when stopping production and restarting production using the prior art conventional or hybrid loop technique.

FIG. 1 shows an installation for securing a production bottom-to-surface connection pipe 1 that is to be made secure when stopping and restarting production, in which, using the prior art technique, a loop is established via an auxiliary pipe 18 that is connected to the end of the production pipe 1 so as to form a loop suitable for replacing the production fluid with an inert replacement fluid in the entire bottom-to-surface connection pipe 1.

Figure 3:
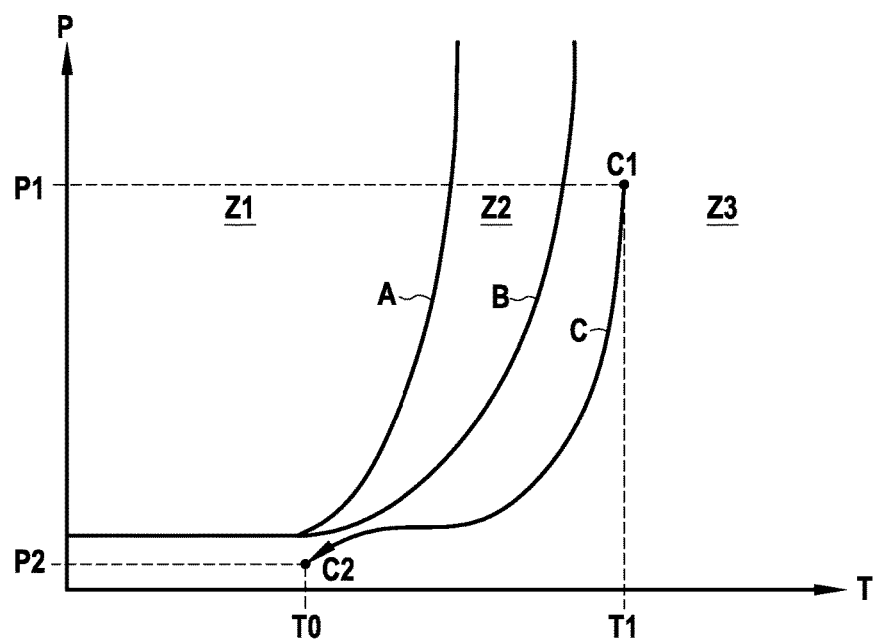
FIG. 3 plots curves showing operating conditions in terms of pressure P and temperature T relative to forming hydrates in said first pipe 1-1 resting on the sea bottom and filled with production fluid.

FIG. 3 plots typical curves showing operating conditions in terms of pressure P and temperature T relating to the formation of hydrates in said first pipe 1-1 resting on the sea bottom and filled with production fluid, as follows:

curve A corresponds to conditions for forming hydrate crystals;

curve B corresponds to conditions for dissolving and for dissociating hydrate crystals;

zone Z1 is the zone where hydrates form and zone Z2 is a zone where there is a risk of hydrate crystals forming. Zones Z1 and Z2 represent conditions that are to be avoided. Zone Z3 is the zone in which hydrates do not form and in which production of the undersea oil field is performed in standard manner at present; and depressurizing said first pipe 1-1 in accordance with the invention makes it possible to follow the downward variation plotted along curve C from C1 to C2.

In the event of an unplanned stoppage of production, the valve V0 at the top of the second pipe portion 1-2 might be closed before the well head production valve V1 is closed. This results in the pressure in the production pipe 1 rising and potentially in a small rise in temperature due to the compression of the production gas, as can be seen in the first rising portion of curve C. Thereafter, the cooling that follows stopping production causes the curve to vary to the left of C1. If the production fluid were to be left untouched, then curve C would reach the zone Z1.

The curve C shown in FIG. 3 plots the path representing the desired variation in the (pressure, temperature) pair in accordance with the present invention for the production fluid in said first pipe 1-1 resting on the sea bottom going from the normal production point C1 at conditions of pressure P1 and temperature T1, to the preserved state at point C2 where the final temperature T0 is the temperature of the sea bottom, i.e. about 4° C., and the final pressure P2 is lower than the pressure for forming hydrates at the sea bottom temperature T0. In addition to the pressure and temperature conditions shown in FIG. 3, hydrate formation requires the presence of gas molecules (hydrocarbon gases from methane to butane, acid gases $CO_2$ or $H_2S$, or nitrogen) together with free water.

The present invention thus makes it possible to preserve the pipe 1 without replacing the fluid, thereby saving the generally observed operating time that is needed for replacing the production fluid with an inert fluid.

In order to specify the relative positions of the ends or of intermediate positions in the various pipes or valves, the terms "proximal" or "ahead of" are used in the description below to designate positions that are closer to the ship or the floating support on the surface, while the terms "distal" or "behind" refer to positions that are further away from the ship or the floating support on the surface relative to some other point such as another valve or another pipe end, following along the path of a fluid flowing in the pipe at this position.

In the two implementations of FIGS. 1A-1C or of FIGS. 2A-2B, as described below in examples 1 and 2, an undersea bottom-to-surface connection pipe 1 is made secure or preserved when stopping production and when restarting production, the pipe comprising a production first pipe portion 1-1 (also referred to below as the "first production pipe 1-1") resting on the sea bottom 16 from a well head 17 to a valve V3 communicating with the bottom end 1-2*a* of a second pipe portion 1-2 (also referred to below as the "second production pipe 1-2") that rises up to a ship or a floating support 10 on the surface 15. The second pipe portion 1-2 may be constituted by a riser that is substantially vertical up to the surface, or it may be constituted by a hybrid pipe made up of a rigid rising pipe column or riser 1-21 that is substantially vertical being tensioned at its top 1-2*c* by a subsurface float 1-3, followed by a flexible hose 1-22 in the form of a dipping catenary serving to connect the riser 1-21 to the ship or floating support 10.

In both implementations, on stopping production, the entire production pipe 1 is subjected to first depressurization followed by additional depressurization of the first pipe portion 1-1 that is full of production fluid, while isolating the first pipe portion 1-1 from the second pipe portion 1-2, and replacing the production fluid in the second pipe portion 1-2 with a replacement gas or fluid.

Preferably, in both implementations, all of the liquid in the second pipe portion 1-2 is emptied out before putting it back into communication with the first pipe 1-1 prior to restarting production.

In both implementations, on restarting production, a gel segment is used to isolate the old production fluid that is cold and depressurized both physically and thermally from the new production fluid that is hot.

In both implementations, the installation includes a first auxiliary pipe 2 for delivering or discharging gas that extends from the ship or floating support 10 on the surface to at least the bottom end 1-2*a* of the riser 1-21 with which it communicates via a valve V6. As explained below, this first auxiliary pipe 2 serves to encourage production fluid to rise within the second pipe 1-2 in a production stage, and also to enable the production fluid in the second pipe portion 1-2 to be replaced by an inert fluid in Example 1, or else to empty the inert replacement fluid from the second pipe portion 1-2 in Example 1 or to discharge gas in order to depressurize the first production pipe in Example 1, or indeed to empty the buffer pipe in Example 2 by injecting gas upstream from the separator gel at the distal end of the buffer pipe 1*a*-1.

The well head 17 communicates with the distal end of the first pipe 1-1 resting on the sea bottom via a pipe segment 1-1*a* that is defined by a valve V1 beside the well head 17 and by a valve V2 at the other end leading to the distal end of the first production pipe 1-1.

A second auxiliary pipe 3 for injecting liquid extends either from a first tank 11 on the ship or floating support that contains methanol or a water and methanol mixture (i.e. a hydrate formation inhibitor), or else from a second tank 12 on the ship or floating support 10 on the surface, to a valve V7 at its distal end on the sea bottom and leading to the pipe segment 1-1*a*.

The second tank 12 contains a liquid constituted by a reagent compound B. The reagent compound B is preferably a hydrate formation inhibitor of the glycol or methanol and ethylene glycol (MEG) type, and it also suitable for forming a gelled liquid, referred to below as the "separator gel", when it is mixed with a reagent compound A contained in a third tank 13, the reagent A being a gelling agent that may be a cross-linking agent or a polymer or a mixture of both, and that is generally a proprietary composition. Examples of gelling agent are borate, or a polymer such as hydroxypropyl guar (HPG). By way of example, it is possible to use the gelling agents having the following commercial references:

glycol pipeline gel (GPG) with the associated GPG gelling agent sold by the supplier Alchemy Oilfield Services Ltd.;

gelling agents such as E-gel sold by the supplier Weatherford;

gels for applications such as de-oiling pipes, as sold by the supplier Intelligent Gels; and substances known as "gel pigs" (separator gels, scraper gels) that are rigid or semi-rigid and sold by the supplier Inpipe Products.

The solid separator gel is used as a physical, chemical, and thermal separator barrier that is interposed between the hot production fluid and the cold degassed fluid contained in the first pipe 1-1, the hot fluid pushing the gel and the cold fluid to the surface without any risk of forming plugs. Specifically, the newly-produced production fluid is inhibited by methanol, but only for the associated quantity of water that is produced. The mixture of this gas-containing production fluid with the degassed production fluid that is cold and contains non-inhibited water, could in principle lead to hydrates forming. This is thus a situation that must be avoided in compliance with current operating rules.

In both implementations, a pipe segment forming a first chamber 5*a* for forming separator gel is arranged in situ at the sea bottom leading to a valve V4 for communicating with the distal end of said first pipe 1-1 ahead of the valve V2 of the pipe segment 1-1*a*.

A third auxiliary pipe 4 extends from a third tank 13 at least as far as a first static mixer 6*a* ahead of the pipe segment forming the first chamber 5*a*. This third auxiliary pipe 4 is intended mainly for feeding the first mixer with the reagent A stored in the third tank 13.

The bottom end of the second auxiliary pipe 3 also communicates via a valve V8 with the first mixer 6*a*. The bottom end of the third auxiliary pipe 4 communicates with the first mixer via a valve V11. A valve V9 serves to put said second and third auxiliary pipes 3 and 4 into communication with each other ahead of the valves V7, V8 and V11.

The first mixer 6*a* serves to feed the first chamber 5*a* with the reaction mixture of the two reagents A and B in order to form the separator gel within the first chamber 5*a*.

In examples 1 and 2 described below, said first and second production pipes 1-1 and 1-2 and the buffer pipe 1*a* are conventionally pipes having diameters of 10 inches (") to 14". Said auxiliary pipes 3 and 4 and branch pipes 3*a* and 4*a* are of smaller diameters and are conventionally referred to as "umbilicals". The umbilicals are bundles of small pipes or tubing, having expected diameters lying in the range 1" to 3" for the auxiliary pipes and for the branch pipes 3-3*a* and 4-4*a*. Said auxiliary pipe 2 and said auxiliary branch pipe 2*a* may be constituted by way of example by rigid pipes of intermediate diameter, typically in the range 4" to 6". Another possibility is that said auxiliary pipe 2 is associated with the second production pipe 1-2 in a coaxial pipe configuration in which the second production pipe 1-2 is the inner pipe and said auxiliary pipe 2 is the annulus formed by the two coaxial pipes. Finally, said auxiliary pipe 2*a* may be in the form of a bundle of umbilical tubing having diameters in the range 2" to 3".

Example 1: First Implementation of FIGS. 1A-1C

In this first implementation, the first auxiliary pipe 2 for transporting gas communicates via a valve V6 with the bottom end of the second pipe 1-2 ahead of the valve V3 (it is closer to the surface than V3). The second auxiliary pipe 3 communicates with the bottom end of the second pipe 1-2 via a branch connection 3'*a* from the point 3-1 ahead of the valve V9, the branch pipe 3'*a* having a valve V10 leading to the second pipe 1-2 between the valves V3 and V6.

Figure 1A:
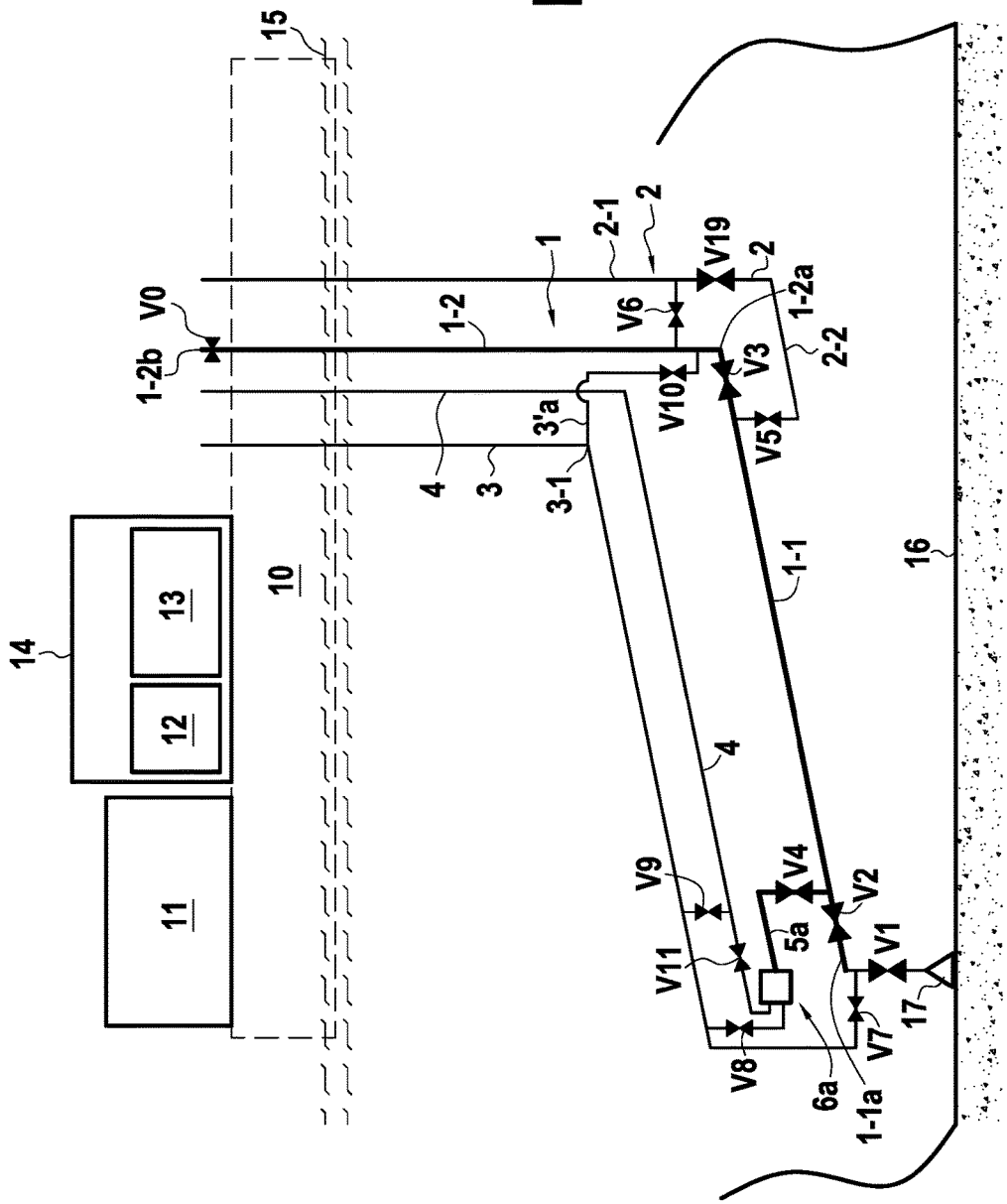
FIGS. 1A to 1C are diagrammatic views of an installation for preserving a production pipe when stopping production and restarting production in a first implementation of the invention using Example 1.
Figure 2B:
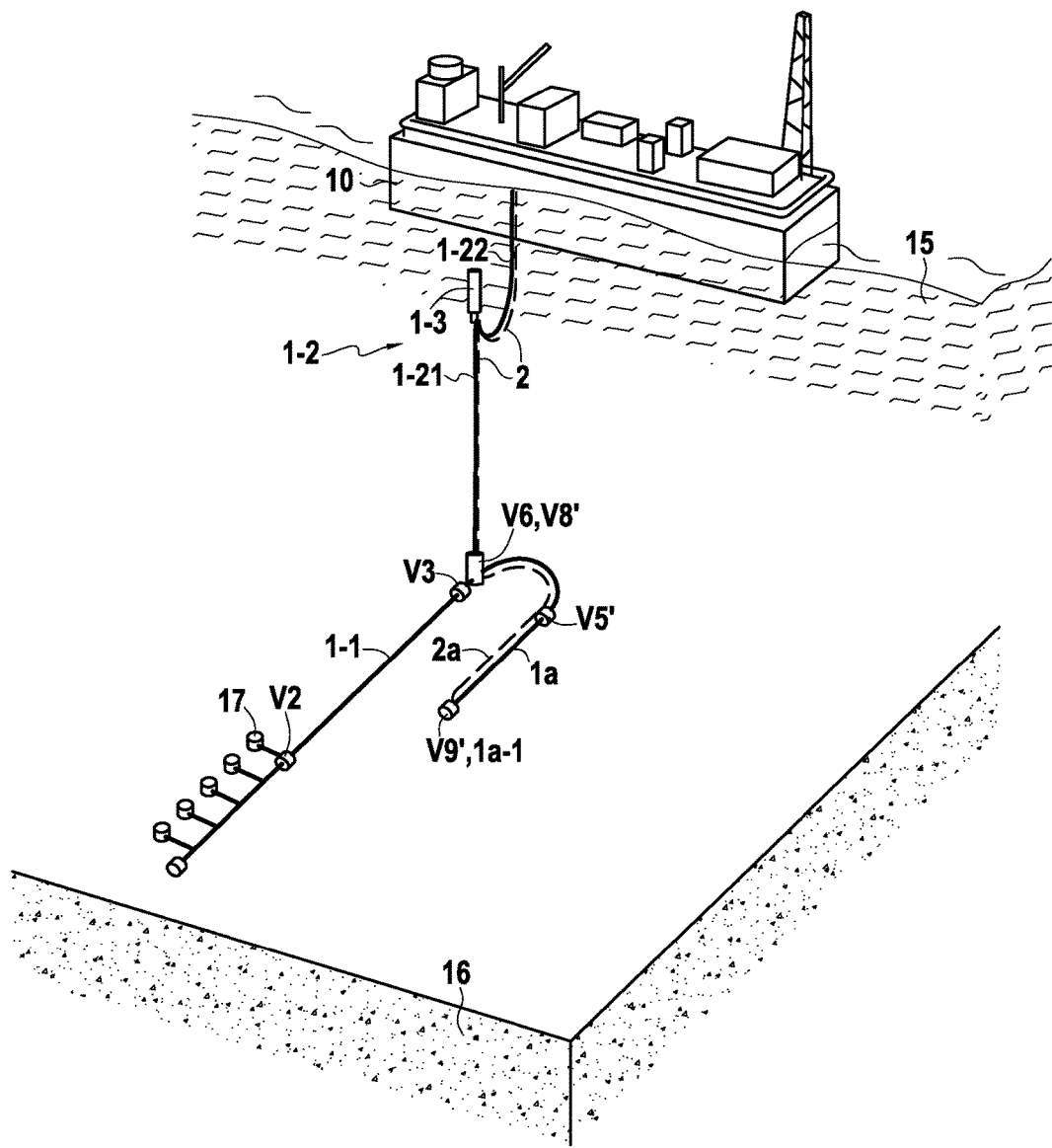

In a first variant shown in FIG. 1A, the first auxiliary pipe 2 for transporting gas has a top portion 2-1 communicating at its bottom end firstly with the valve V6 and secondly with a valve V19 suitable for isolating a bottom portion 2-2 of said first auxiliary pipe 2 having its distal end including a valve V5 communicating with the proximal end of the first pipe 1-1 immediately behind the valve V3 (further away from the surface than V3).

Figure 1B:
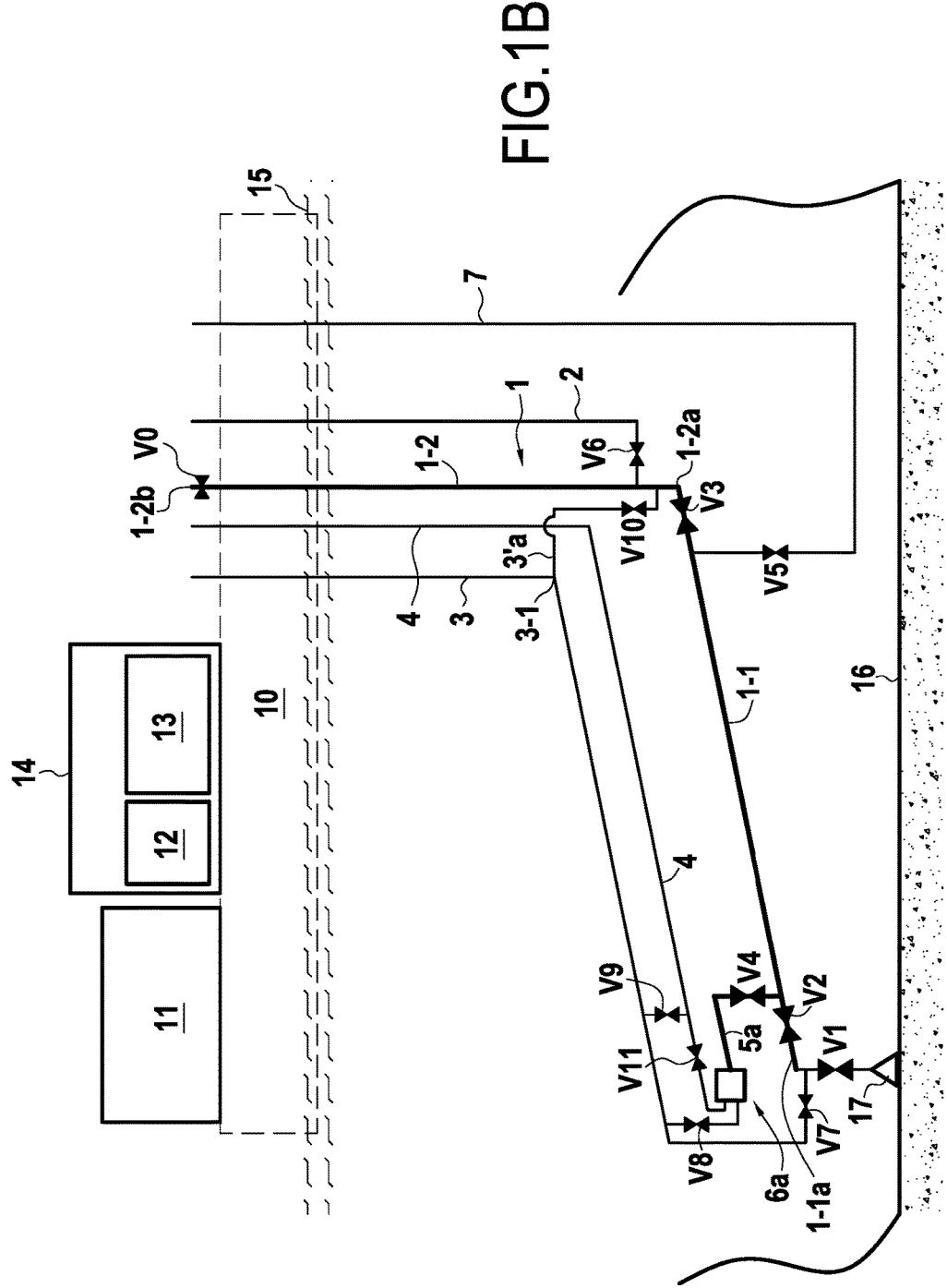
Figure 1C:
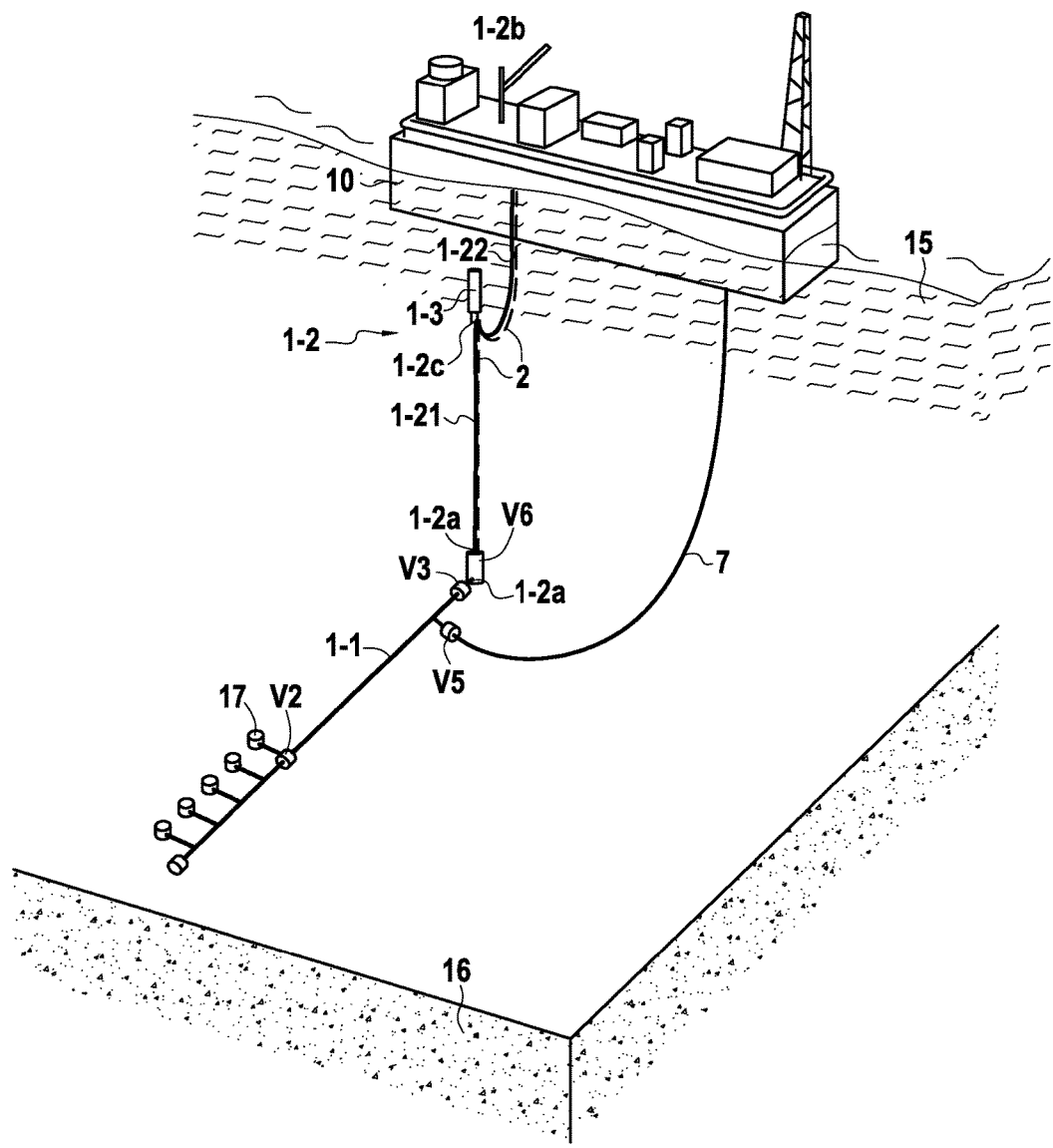

In a second variant, shown in FIG. 1B, the first auxiliary pipe 2 for transporting gas does not have a said bottom portion 2-2 nor does it have a valve V19 suitable for isolating a bottom portion 2-2, however there is a valve V5 communicating with the proximal end of the first pipe 1-1 immediately behind the valve V3, which is connected to a fourth auxiliary pipe 7 rising to the surface.

The first variant represents the solution that is more optimized in that the first auxiliary pipe 2 is already present for injecting gas to provide gas lift at the bottom of said second production pipe portion 1-2 so that only the bottom portion of the first auxiliary pipe 2-1 needs to be added to the configuration.

A) Production Stage

During a production stage, only the valves V0, V1, V2, V3, and V6 are open. All of the other valves are closed. The open valves V1, V2, and V3 allow the production fluid (crude oil) to rise to the surface via the bottom-to-surface connection pipe 1. Opening the valve V6 and injecting gas into the auxiliary pipe 2 from the surface at the bottom end 1-2*a* of the second pipe 1-2 serves to facilitate raising the production fluid to the surface in the second pipe 1-2.

At this stage, the second and third auxiliary pipes 3 and 4 and the first chamber 5*a* and the first mixer 6*a* are full of methanol for performing preservation and restarting measures in the event of production subsequently being stopped, as described below.

B) Stopping Production

In order to stop production, the valves V0, V1, and V6 are closed. The valve V7 is then opened and methanol is injected via the second auxiliary pipe 3 into the well head 17 and towards the valve V2 so as to replace the production fluid. The valve V2 is then closed.

Thereafter, the valve V0 on the surface at the top end 1-2*b* of the second pipe 1-2 is opened so as to degas the production fluid contained in the two production pipes 1-1 and 1-2, thereby performing first depressurization of said production pipes 1-1 and 1-2 in full.

The fluid contained in the first pipe 1-1 is at an average pressure that is higher than in the second pipe 1-2 because of the liquid column in the second pipe 1-2 between the bottom and the surface. That is why it is subsequently depressurized again after closing the valves V3 and V7 and opening the valves V5 and V19 in the variant of FIG. 1A so as to discharge the residual gas contained in the production fluid within the first pipe 1-1 and reduce the pressure in the first pipe 1-1 so as to further impede any formation of hydrate plugs. Alternatively, in the variant of FIG. 1B, the additional depressurization of the first pipe 1-1 may be performed via a dedicated umbilical, i.e. the fourth auxiliary pipe 7, by opening the valve V5.

By way of illustration, at a depth of 1000 m, the pressure in the first pipe goes from a pressure of several tens of bars (i.e. generally above the pressure at which hydrates form at ambient temperature (Z1)) prior to additional depressurization, to less than about ten bars (i.e. in the hydrate-free zone Z3) after the additional depressurization.

Thereafter, the production fluid in the second pipe 1-2 is replaced by injecting the replacement fluid into the pipe. For this purpose, the valves V6, V8, and V9 being closed by default (normal operation position), and V7 being closed during the preceding step, the valve V10 is opened and then methanol or a water/methanol mixture is injected from the tank 11 via the third auxiliary pipe 3 to the second production pipe 1-2 at its bottom end 1-2*a* while discharging production fluid from the top 1-2*b* of the second pipe 1-2 on the surface. Thereafter, once the second production pipe is full of methanol, V10 is reclosed.

In practice, and by way of illustration, for the second pipe portion 1-2 having a length of 1000 m, that represents about 50 cubic meters (m$^3$) of replacement fluid.

Alternatively, the fluid in the second production pipe 1-2 may be replaced by injecting a replacement fluid, methanol or a water/methanol mixture, from the tank 11 via the first auxiliary pipe 2, also referred to as the gas lift injection line. With the installation of FIG. 1A, after the second depressurization of the first production pipe 1-1, this operation then requires the valve V19 at least to be closed initially and the valve V6 to be re-opened.

More precisely, the replacement fluid can be injected into the top portion 2-1 of said second auxiliary pipe from the ship or the floating support 10 to go to the second pipe 1-2, thus replacing and pushing the production fluid towards the ship or floating support 10 after depressurizing said first pipe 1-1, closing the valve V19, and then opening the valve V6. Thus, the replacement fluid can be injected into the top portion of said second auxiliary pipe from the ship or floating support 10 to go to the second pipe 1-2 to replace and thus push the production fluid towards the ship or floating support 10.

C) Preparation Prior to Starting Production

Prior to restarting production, the separator gel is prepared and stored in the first chamber 5*a*, and then the second pipe 1-2 is emptied, as follows.

In order to prepare and store the separator gel in the first chamber 5*a*, the valves V8 and V11 are opened while the valve V9 is left closed, and then the first static mixer 6*a* is fed with the reagent B, e.g. of the MEG type, via the second auxiliary pipe 3, and is fed with the reagent A via the third auxiliary pipe 4 so as to feed the chamber 5*a* and form the separator gel therein. Since the pressure in the first chamber 5*a* is higher than the pressure at the distal end of the first pipe portion 1-1, the valve V4 is opened. This ensures that production fluid does not flow back into the first chamber 5*a*. The methanol initially contained in the auxiliary pipes 3 and 4 and also in the first mixer 6*a* and the first chamber 5*a* is thus evacuated via the valve V4 into the first production pipe 1-1. Thereafter, the valve V4 is closed when the first chamber 5*a* is completely full of separator gel reaction mixture (A+B) and time is allowed for the gel to form.

Thereafter, in order to avoid the reagent A stagnating for too long in the third auxiliary pipe 4 and in order to restore its pre-existing methanol state, replacement is performed using methanol. To do this, the valve V9 is opened and the valves V8 and V11 are closed, and methanol is sent from the tank 11 into the second auxiliary pipe 3, which methanol discharges through the valve V9 into the third auxiliary pipe 4 and then to the top of the third auxiliary pipe 4. Thereafter, when said auxiliary pipes 3 and 4 are full of methanol, the valve V9 is closed. After discharging the separator gel from the first chamber 5a, it is also possible to purge the first mixer 6a by keeping the valve V9 closed and the valves V8 and V11 open while performing methanol replacement.

Prior to restarting production, the second pipe 1-2 is preferably emptied by injecting inert gas therein, preferably the dehydrated gas for gas lift from its top end 1-2b on the surface, and the replacement fluid contained in the second production pipe 1-2 is discharged via the first auxiliary pipe 2 through the open valve V6, while the valves V3, V5, and V10 are closed. This has the advantage of reducing pressure in the first pipe 1-1 on restarting when Opening the valve V3, thereby preventing the pressure of the column of liquid contained in the second pipe 1-2 being transferred to the first pipe 1-1, which is depressurized to a safe pressure since that might lead to a sudden increase in pressure with the potential risk of causing hydrate plugs to be formed in the first pipe 1-1.

D) Restarting Production

In order to restart production, the valves V4 and V11 or V8 are opened and the separator gel is injected from the first chamber 5a into the first production pipe 1-1 by injecting methanol via the valves V11 or V8 into the first mixer 6a. An additional methanol plug may also be created ahead of the separator gel after it has been introduced into the first production pipe portion 1-1.

Thereafter, once a segment of separator gel has been introduced into the production pipe 1-1, that one of the valves V4 or V8 that was opened is closed, and the valves V1, V2, and V7 are opened. Hot production fluid from the well head 17 is sent in behind the separator gel segment, which isolates the hot production fluid from the cold and degassed production fluid contained in the first production pipe 1-1, and is then caused to rise in the second production pipe 1-2, the valve V3 being re-opened. For this purpose, with the valve V6 open, gas lift gas is injected from the top of the first auxiliary pipe 2 in order to facilitate raising the production fluid moving up the second production pipe 1-2.

At the same time, the valve V7 is opened and the inhibitor, i.e. methanol, is delivered in order to inhibit hydrate formation in the production fluid at the well head in the first pipe 1-1.

Example 2: Second Implementation of FIGS. 2A-2B with Buffer Pipe

In this second implementation, the installation has the following differences and additional elements compared with the installation used in the first implementation.

Firstly, the installation has a "buffer" pipe 1a lying on the sea bottom and extending from the bottom end 1-2a of said second production pipe 1-2 to which it is connected at its proximal end via a valve V5', said buffer pipe being closed at its distal end 1a-1. This buffer pipe has a volume that is substantially equal to the volume of the second pipe portion 1-2.

A said first auxiliary pipe 2 for transporting gas has, at its bottom end: firstly the valve V6 communicating with the bottom end of the second pipe 1-2 ahead of the valve V3 (closer to the surface than V3); and secondly a branch connection pipe 2a. The branch connection pipe 2a for transporting gas communicates with the buffer pipe 1a at two levels, firstly at the proximal end of the buffer pipe immediately behind the valve V5' via a valve V8', and secondly at the distal end 1a-1 of the buffer pipe via a valve V9'.

In contrast, said first auxiliary pipe 2 for transporting gas no longer has the valve V5 communicating with the proximal end of the first pipe 1-1 immediately behind the valve V3, as in the first implementation.

The second auxiliary pipe 3 for transporting methanol or reagent B such as MEG respectively from the tanks 11 or 12, has a second branch connection pipe 3a that goes from a point 3-1 ahead of the valve V9 to a valve V13 at its distal end leading to a second static mixer 6b. Likewise, the third auxiliary pipe 4 for transporting reagent A includes a third branch connection pipe 4a going from a point 4-1 situated immediately in front of a valve V16 in front of the valve V9 of the third auxiliary pipe 4. The third branch connection pipe 4a has a valve V17 at its proximal end, i.e. immediately after the branch connection point 4-1 and extending to a valve V18 leading to the second static mixer 6b.

The second static mixer 6b leads to a pipe segment forming a second separatorgel-forming chamber 5b. The second mixer 6b serves to feed the second chamber 5b with the reaction mixture of the two reagents A and B in order to form the separator gel within the second chamber 5b.

The second chamber 5b communicates with the distal end of the buffer pipe 2a via a valve V6'.

The separator gel is used to enable the buffer pipe to be emptied, as described below.

The second and third branch connection pipes 3a and 4a communicate with each other via a valve V14 situated ahead of the valves V13 and V18 (V14 is thus in a proximal position closer to the surface than V13 and V18).

The third auxiliary pipe 4 has a valve V16 after the branch connection point 4-1 ahead of the valve V9, which valve V16 when open serves to feed the reagent A to the first mixer 6a.

A) Production Stage

During a stage of production, only the valves V0, V1, V2, V3, and V6 are open. All of the other valves are closed. The procedure is as in Example 1. Opening the valves V1, V2, and V3 enables the production fluid (crude oil) to rise to the surface via the bottom-to-surface connection pipe 1. Opening the valve V6 serves to facilitate raising the production fluid to the surface in the second pipe 1-2 by injecting gas into the first auxiliary pipe 2 from the surface.

The second and third auxiliary pipes 3 and 4 and the second and third branch connection pipes 3a and 4a and also the first and second chambers 5a and 5b and the first and second mixers 6a and 6b are all full of methanol.

B) Stopping Production

In order to stop production, the valves V0, V1, and V6 are closed. Thereafter, the valve V7 is opened and methanol is injected via the second auxiliary pipe 3 into the well head 17 and towards the valve V2 until the production fluid has been replaced. The valve V2 is then closed.

Thereafter, the valve V0 is opened on the surface at the top end of the second pipe 1-2, in order to enable the production fluid contained in the first and second production pipes 1-1 and 1-2 to be degassed so as to perform first depressurization of said pipes 1-1 and 1-2, as described in Example 1.

In this second implementation, in order to preserve the bottom-to-surface connection pipe 1 as much as possible from any hydrate formation, the second production pipe 1-2 is emptied and the first pipe portion 1-1 is depressurized more completely by degassing the empty second pipe portion.

For this purpose, the content of the second production pipe 1-2 is passively drained or emptied into the buffer pipe 1a, by closing the valve 3V and opening the valves V5' and V8'. Opening V8' serves to discharge gas from the buffer pipe while it is being filled via the valve V5' with the production fluid from the pipe 1-2.

Once the second pipe 1-2 has emptied into the buffer pipe 2a, the valves V5' and V8' are closed and the valve V3 is opened to discharge more thoroughly the residual gas contained in the production fluid inside the first pipe 1-1 to the empty second pipe 1-2, thereby performing additional depressurization thereof via the empty second pipe 1-2. Thereafter, the valve V3 is closed once more.

In this second implementation, it is thus possible to leave the second production pipe 1-2 full of production gas without filling it with methanol. The entire production pipe is then preserved since it is at a pressure lower than the pressure for forming hydrates at ambient temperature.

It should be observed that in Example 1 it is not possible to empty the production fluid from the second pipe 1-2 by sending inert gas into it, possibly the gas used for gas lift, from its top and discharging the gas via the first auxiliary pipe 2, since that would lead to the risk of hydrates forming in the first auxiliary pipe 2. Specifically, the first auxiliary pipe 2, or gas lift line, is generally a line of small diameter with little thermal inertia and thus only a short available cooling time (a few hours). By passing a production fluid containing gas and including water in this pipe, it is very likely that the low temperature and the high pressure due to the movement and to the hydrostatic column as created in this way would lead to hydrates forming, which could quickly block this small section line.

C) Preparation Prior to Starting Production

Before restarting production, the separator gel is prepared and stored in the first and second chambers 5a and 5b as follows.

In order to fill the first chamber, the valves V8, V11, and V16 are opened while the valves V7, V9, V17, V13, and V14 are left closed. Thereafter the first static mixer 6a is fed with reagent B, e.g. of the MEG type, via the second auxiliary pipe 3, and it is fed with reagent A via the third auxiliary pipe 4 so as to feed the first chamber 5a with separator gel, as in Example 1. Initially, the methanol contained in the auxiliary pipes 3 and 4 and in the first mixer 6a and in the first chamber 5a is discharged, as in Example 1.

In order to avoid leaving the reagent A stagnate for too long in the third auxiliary pipe 4, it is filled with methanol, as is the second auxiliary pipe 3, as in Example 1.

In order to fill the second chamber 5b, with valves V4 and V7 being closed by default, the valves V16, V8, and V9 are closed and the valves V13, V17, and V18 are opened. Thereafter, the second static mixer 6b is fed with MEG type reagent B via the second auxiliary pipe 3 and the second branch connection pipe 3a, and it is fed with reagent A via the third auxiliary pipe 4 and the third branch connection pipe 4a so as to feed the second chamber 5b with separator gel. Initially, the methanol contained in the auxiliary pipes 3 and 4 and in the branch connection pipes 3a and 4a, and also in the second mixer 6b and the second chamber 5b is discharged via the valve V6' that is open in the buffer pipe 2a, the valve V5' being opened beforehand. Since the pressure in the second and third auxiliary pipes 3 and 4 and in the second and third branch connections 3a and 4a is higher than the pressure at the distal end of the buffer pipe 1a-1, the production fluid does not flow back into the chamber 5b.

Thereafter, the valve V6' is closed once the chamber 5b is completely full of separator gel reaction mixture (A+B) and time is allowed for the gel to form.

Once the chamber 5b is full of gel, and in order to avoid the reagent A stagnating for too long in the third auxiliary pipe 4 and the third branch connection pipe 4a, they are filled with methanol, as are the second auxiliary pipe 3 and the second branch connection pipe 3a. For this purpose, the valves V14 and V17 are opened, the valves V13, V18, and V16 are closed, and methanol is sent from the tank 11 into the third auxiliary pipe 4 and into the branch connection pipe 4a, which methanol is discharged through the valve V14 via the branch connection pipe 3a to the top of the second auxiliary pipe 3 (the valves V8, V13, V17, and V18 being closed). Thereafter, when said auxiliary pipes 3 and 4 and said auxiliary branch connections 3a and 4a are full of methanol, the valve V14 is closed. After discharging the separator gel from the second chamber 5b, it is also possible to purge the first mixer 6b by keeping the valve V14 closed and the valves V18 and V13 open during the time required for replacement with methanol.

The separator gel contained in the second chamber 5b is used to empty the buffer pipe without any risk of hydrates forming prior to restarting production by sending the gel to the distal end of the buffer pipe and by discharging it to the top of the second production pipe 1-2 as follows.

The valves V13 and V6' are opened, while the valves V14, V8, V17, and V18 are closed, and methanol is sent via the second auxiliary pipe 3 and the second branch connection pipe 3a, which methanol pushes the gel from the chamber 5b into the buffer pipe 2a.

Thereafter, the valve V6' is closed and the valve V9' is opened, and inert gas, preferably the gas lift gas, is sent to the distal end 2a-1 of the buffer pipe 2a from the top of the first auxiliary pipe 2, the valve V8' being closed. Said gas thus pushes the gel and the content in the buffer pipe ahead of the gel towards the second pipe 1-2 in order to be discharged at its top 1-2b. Once the buffer pipe 2a and then the second pipe portion 1-2 have been emptied of their liquid content, the valves V9' and V5' are closed.

It would not be possible to empty the buffer pipe via the riser 1-2 without the gel merely by injecting gas into the buffer pipe, since because of its large section that would require the pressure and the flow rate of the gas to be unrealistic. Furthermore, the production fluid in the buffer pipe contains degassed oil and water at low temperature. Mixing it with high-pressure gas would cause hydrates to form. In contrast, since the gel is solid it can be pushed by the gas while maintaining a physical separation interface, given its mechanical and chemical qualities.

In contrast, in Example 1, it is possible to push the liquid from the riser 1-2 upwards in the auxiliary pipe 2 with gas sent from the top of the riser 1-2, since the auxiliary pipe 2 up which it rises is of smaller diameter. Furthermore, the inert gas is then pushing a replacement fluid, which itself is a hydrate inhibitor.

D) Restarting Production

In order to restart production, the valve V4 is opened and the separator gel is sent from the first chamber 5a into the first production pipe 1-1, and the procedure continues as in Example 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of stopping and restarting production in an undersea bottom-to-surface connection production pipe comprising a first pipe portion resting on a sea bottom from a well head to a bottom end of a second pipe portion going up to a ship or floating support on a surface, in which method, when production is stopped, at least said first pipe portion is filled with a depressurized production fluid, the method comprising:
   e1) forming a gel from two reagents in a first gel-forming chamber on the sea bottom, said first chamber communicating with an end of the first pipe portion that is closest to the well head; and
   e2) sending a quantity of said gel into the first pipe portion from said first chamber forming a separator gel segment that pushes cold fluid contained in the first pipe portion to the second pipe portion, prior to closing said first chamber; and then
   e3) starting production by sending said production fluid from a production fluid well into the first pipe portion behind a separator gel segment, said production fluid pushing said gel segment into said bottom-to-surface connection pipe towards its top, said gel forming a physical separation and also thermal isolation between firstly the production fluid behind said gel segment within the first pipe portion and secondly a fluid that has been at least partially degas sed ahead of said gel segment within said first production pipe portion.

2. The method according to claim 1, wherein prior to restarting production in step e3), and prior to putting the first production pipe portion into communication with said second production pipe portion, all of the liquid contained in said second pipe portion is emptied.

3. The method according to claim 1, wherein in step e1), the following steps are performed:
   e1-1) sending a first liquid reagent compound into a second auxiliary pipe extending to a first static mixer situated on the sea bottom and leading into said first chamber; and
   e1-2) in parallel with e1-1), sending a second liquid reagent compound in a third auxiliary pipe extending to said first static mixer situated on the sea bottom and leading into said first chamber; and
   e1-3) mixing the two reagents within said static mixer and allowing the separator gel to form by reaction between the mixture of two reagents within said first chamber.

4. The method according to claim 3, wherein after step e1), the reagents contained in said second and third auxiliary pipes are replaced by an inert replacement fluid.

5. The method according to claim 4, wherein the reagents contained in said second and third auxiliary pipes are replaced by an inert replacement fluid by sending said replacement fluid from the ship or floating support on the surface into said second auxiliary pipe and by discharging the content of said second auxiliary pipe to the third auxiliary pipe and then to the top of the third auxiliary pipe at the ship or floating support, said second and third auxiliary pipes being made suitable for communicating with each other.

6. The method according to claim 1, wherein in step e2), an inert replacement fluid is sent from the ship or floating support on the surface in said second or third auxiliary pipe, thereby pushing said separator gel from said first chamber towards said first production pipe portion.

7. The method according to claim 1, wherein after stopping production, first depressurization of the entire bottom-to-top connection production undersea pipe is performed allowing a portion only of the gas contained in the production fluid contained in said production pipe to be discharged on the surface via its top end, the method being characterized in that the following subsequent steps are then performed:
   a) isolating said first production pipe portion from said second pipe portion, and leaving the production fluid in said first production pipe portion, but not in said second pipe portion, which is emptied; and
   b) additionally depressurizing the first production pipe portion filled with production fluid by reducing the pressure in said first pipe portion and by discharging more completely the gas contained in the production fluid that it contains.

8. The method according to claim 7, wherein the following steps are performed:
   a1) in step a), after isolating said second pipe portion from said first pipe portion, replacing the production fluid within said second pipe portion by injecting an inert replacement fluid into a second auxiliary pipe extending from a first tank on the ship or floating support on the surface to the bottom end of the second pipe portion isolated from the first pipe portion; and
   b1) in step b), performing additional depressurization of the first production pipe portion isolated from said second pipe portion and filled with production fluid, by reducing the pressure in said first pipe portion and more completely discharging the gas contained in the production fluid it contains, to an auxiliary gas discharge pipe extending from the end of said first production pipe portion closest to the bottom end of said second production pipe portion to the ship or floating support on the surface.

9. The method according to claim 8, wherein in step a1), the production fluid within said second pipe portion is replaced by injecting an inert replacement fluid from a first tank on the ship or floating support on the surface into a first auxiliary gas riser pipe or a second auxiliary pipe extending to the bottom end of the second pipe portion that is previously isolated from the first pipe portion after depressurizing said first pipe portion, said inert fluid thus replacing and pushing the production fluid back towards the ship or floating support.

10. The method according to claim 9, wherein before the steps of restarting production in step e3), before putting the first pipe portion resting on the sea bottom into communication with the second pipe portion rising to the surface and sending the production fluid from the well head, said second pipe portion is emptied by injecting inert gas into the second pipe portion from the top of the second pipe portion and discharging the inert replacement fluid from the second pipe portion to the surface via a first auxiliary gas riser pipe that extends up to the surface from the bottom end of said second pipe portion to which it is connected.

11. The method according to claim 7, wherein after stopping production, the following steps are performed:

a2) in step a), leaving the production fluid in said first production pipe portion, and emptying said second pipe portion isolated from said first pipe portion by transferring the production fluid within said second pipe portion into a buffer tank connected to the bottom end of said second pipe portion; and b2) in step b), performing additional depressurization of the first production pipe portion filled with production fluid by putting it into communication with said second pipe portion and by more completely discharging the gases contained in the production fluid of the first pipe portion towards said second production pipe portion that has previously been emptied of all liquid.

12. The method according to claim 11, wherein in step a2), in order to transfer the production fluid from said second pipe portion to a buffer tank formed by a buffer pipe extending on the sea bottom from the bottom end of said second pipe portion, the gas contained in the buffer pipe is simultaneously discharged via a first auxiliary gas riser pipe that is connected thereto via respective valves (V8', V9') situated firstly at its proximal end and secondly at its distal end.

13. The method according to claim 11, wherein before restarting production in steps e1) to e3), said buffer pipe is emptied.

14. The method according to claim 13, wherein in order to empty the buffer pipe, a separator gel is inserted at the distal end of the buffer pipe and is pushed by injecting gas so as to cause it to move together with the liquid content of the buffer pipe towards the bottom end of the second pipe portion, and then all along the second pipe portion in order to be evacuated at the top thereof.

15. The method according to claim 14, wherein before emptying the buffer pipe by introducing a separator gel, the following steps are performed:

c) forming a gel from two reagents in a second gel-forming chamber on the sea bottom, said second chamber communicating with the distal end of the buffer pipe, said second chamber being formed by an in situ pipe segment on the sea bottom having its end leading to the proximity of the distal end of the buffer pipe resting on the sea bottom; and d) sending a quantity of said separator gel into the buffer pipe from said second chamber and forming a separator gel segment pushing the fluid contained in the buffer pipe to the top of said second production pipe portion, prior to closing said second chamber.

16. The method according to claim 15, wherein in order to form the separator gel in step c), the following steps are performed:

c1 sending, from the ship or floating support on the surface, a first reagent liquid compound in a said second auxiliary pipe and then a second branch connection pipe extending to a second static mixer situated at the sea bottom and leading to said second chamber; and c2) ending, from the ship or floating support on the surface, a second reagent liquid compound in a third auxiliary pipe and then a third branch connection pipe extending to said second static mixer situated on the sea bottom and leading to said second chamber; and c3) mixing the two reagents within said second static mixer and allowing the separator gel to form by reaction between the mixture of two reagents within said second chamber.

17. The method according to claim 16, wherein after step d), the reagents contained in said second and third auxiliary pipes and said second and third branch connection pipes are replaced by an inert replacement fluid.

18. The method according to claim 17, wherein the reagents contained in said second and third auxiliary pipes and said second and third branch connection pipes are replaced by an inert replacement fluid by sending said replacement fluid from the ship or floating support on the surface into said second auxiliary pipe and discharging the content of said second auxiliary pipe to the third auxiliary pipe and then to the top of the third auxiliary pipe at the ship or floating support, said second and third auxiliary pipes being made suitable for communicating with each other.

19. The method according to claim 15, wherein in step d), before closing said second chamber, an inert fluid such as methanol is sent from the ship or floating support on the surface into a said second or third auxiliary pipe and said second or third branch connection pipes, thereby pushing said separator gel from said second chamber into said buffer pipe prior to pushing it to the top of said second production pipe portion by injecting gas into the end of the buffer pipe.

20. The method according to claim 16, wherein in step d), or after step d), the gel and the liquid in said buffer pipe and then in the second production pipe portion is raised by sending inert gas from the ship or floating support on the surface into said first auxiliary pipe leading to the distal end of the buffer pipe.

21. An installation for producing fluid such as crude oil and suitable for performing the method according to claim 1, the installation comprising at least:

a ship or floating support on the surface having at least two tanks; and an undersea bottom-to-surface connection production pipe comprising a first pipe portion resting on the sea bottom from a well head to a bottom end of a second pipe portion rising to a ship or floating support on the surface; and a first auxiliary pipe for transporting gas extending at least from the ship or floating support on the surface to the bottom end of said second pipe portion; and a second auxiliary pipe extending at least from a first or second tank containing an inert replacement fluid or a first separator gel reagent on board the ship or floating support on the surface to a first static mixer, said second auxiliary pipe being suitable for transferring the inert replacement fluid or a first separator gel reagent into said first mixer; and a third auxiliary pipe extending at least from a third tank containing a second separator gel reagent on board the ship or floating support on the surface to the first static mixer, said third auxiliary pipe being suitable for transferring said second separator gel reagent into said first mixer; and a first separator gel-forming chamber, said first chamber leading at its other end to the proximity of the end of the first pipe portion resting on the sea bottom that is closest to the well head.

22. The installation according to claim 21, comprising a plurality of valves, comprising at least:

respective valves (V4) suitable for isolating or putting into communication said first chamber and the end of said first production pipe portion that is closest to the well head; and respective valves (V8, V11) suitable for isolating or putting into communication said second and third auxiliary pipes with said first mixer; and a valve (V9) suitable for isolating or putting into communication said second and third auxiliary pipes immediately ahead of said first mixer.

23. The installation according to claim 22, comprising a valve (V10) suitable for isolating or putting into communication said second auxiliary pipe and the bottom end of said second pipe portion.

24. The installation according to claim 21, comprising a plurality of valves comprising at least:
- a valve (V6) suitable for isolating or putting into communication said first auxiliary pipe for transporting gas and the bottom end of said second production pipe portion; and
- a valve (V3) suitable for isolating or putting into communication said first production pipe portion and said second production pipe portion, end to end.

25. The installation according to claim 21, further comprising a valve (V5) suitable for isolating or putting into communication the proximal end of said first production pipe portion and the bottom end either of a fourth auxiliary pipe rising directly to the surface, or else a bottom portion of said first auxiliary pipe connected via an isolating or communicating valve (V19) to a top portion of said first auxiliary pipe, said first portion of said first auxiliary pipe being connected to a valve (V6) suitable for isolating or putting into communication said first auxiliary pipe and the bottom end of said second production pipe portion.

26. The installation according to claim 21, further comprising a buffer tank connected to the bottom end of said second pipe portion, said buffer tank being a buffer pipe extending on the sea bottom from the bottom end of said second pipe portion.

27. The installation according to claim 26, further comprising a second separator gel-forming chamber, said second chamber leading at its other end to the proximity of the distal end of the buffer pipe resting on the sea bottom.

28. The installation according to claim 27, further comprising:
- a first branch connection pipe for transporting gas extending from said first auxiliary pipe to the distal end of the buffer pipe;
- a second branch connection pipe extending from said second auxiliary pipe to a second static mixer situated on the sea bottom and leading to a second chamber; and
- a third branch connection pipe extending from a third auxiliary pipe to said second static mixer situated on the sea bottom and leading to said second chamber; and
- said second chamber leading to the distal end of the buffer pipe.

29. The installation according to claim 26, comprising a plurality of valves comprising at least:
- a valve (V5') suitable for isolating or putting into communication the proximal end of the buffer pipe and the bottom end of said production pipe portion; and
- a valve (V9') suitable for isolating or putting into communication the distal end of the buffer pipe and the distal end of said first branch connection pipe for transporting gas; and
- a valve (V8') suitable for isolating or putting into communication the distal end of said first auxiliary pipe for transporting gas or the proximal end of said first branch connection pipe for transporting gas with the proximal end of the buffer pipe.

30. The installation according to claim 28, comprising a plurality of valves, comprising at least:
- valves (V13, V18) suitable for isolating or putting into communication said second and third branch connection pipes respectively with said second mixer; and
- a valve (V14) suitable for isolating or putting into communication said second and third branch connection pipes immediately ahead of said second mixer.

* * * * *